US006695578B2

(12) United States Patent
Winslow et al.

(10) Patent No.: US 6,695,578 B2
(45) Date of Patent: Feb. 24, 2004

(54) BLEED VALVE SYSTEM FOR A GAS TURBINE ENGINE

(75) Inventors: Christopher L. Winslow, Trumbull, CT (US); Alejandro Anduze, Royal Palm Beach, FL (US)

(73) Assignee: Sikorsky Aircraft Corporation, Stratford, CT (US)

( * ) Notice: Subject to any disclaimer, the term of this patent is extended or adjusted under 35 U.S.C. 154(b) by 197 days.

(21) Appl. No.: 10/025,227

(22) Filed: Dec. 19, 2001

(65) Prior Publication Data

US 2003/0111627 A1 Jun. 19, 2003

(51) Int. Cl.[7] .............................................. F01B 25/00
(52) U.S. Cl. ..................... 415/145; 454/76; 137/625.38
(58) Field of Search ....................... 415/145; 137/625.3, 137/625.33, 625.38; 60/262; 454/71, 76

(56) References Cited

U.S. PATENT DOCUMENTS

| | | | |
|---|---|---|---|
| 3,104,520 A | * 9/1963 | Cazier et al. ................ 415/145 |
| 3,842,720 A | * 10/1974 | Herr ............................ 454/71 |
| 4,356,837 A | * 11/1982 | Dickinson ................... 137/238 |
| RE32,197 E | * 7/1986 | Self ............................. 251/127 |
| 4,715,779 A | 12/1987 | Suciu | |
| 4,880,065 A | * 11/1989 | McDonald et al. ........... 175/71 |
| 5,113,649 A | 5/1992 | Siedlecki, Jr. | |
| 5,380,151 A | 1/1995 | Kostka et al. | |
| 5,531,566 A | 7/1996 | Derouet et al. | |
| 5,617,890 A | 4/1997 | Brehm et al. | |
| 5,934,083 A | 8/1999 | Scherer et al. | |
| 5,956,960 A | 9/1999 | Niggeman | |
| 6,048,171 A | 4/2000 | Donnelly et al. | |
| 6,068,237 A | 5/2000 | Holmes et al. | |
| 6,161,839 A | 12/2000 | Walton et al. | |
| 6,189,324 B1 | 2/2001 | Williams et al. | |

* cited by examiner

*Primary Examiner*—John Fox
(74) *Attorney, Agent, or Firm*—Carlson, Gaskey & Olds

(57) ABSTRACT

A bleed valve assembly includes a valve poppet having a bleed portion and a base portion separated by a radially extending flange. The radially extending flange is located about the perimeter of the valve poppet to engage the valve seat on one side and receive a biasing member on the other. The flange engages the valve seat such that initial valve performance is similar to a disk valve, i.e., soft seating and very low leakage when closed. A plurality of openings extend through the bleed portion such that partial open operation of the bleed valve assembly is particularly tailored for a desired flow. As the valve poppet of the present invention moves off the valve seat, the initial gain is very low and then the gain increases steadily as more openings are exposed.

10 Claims, 6 Drawing Sheets

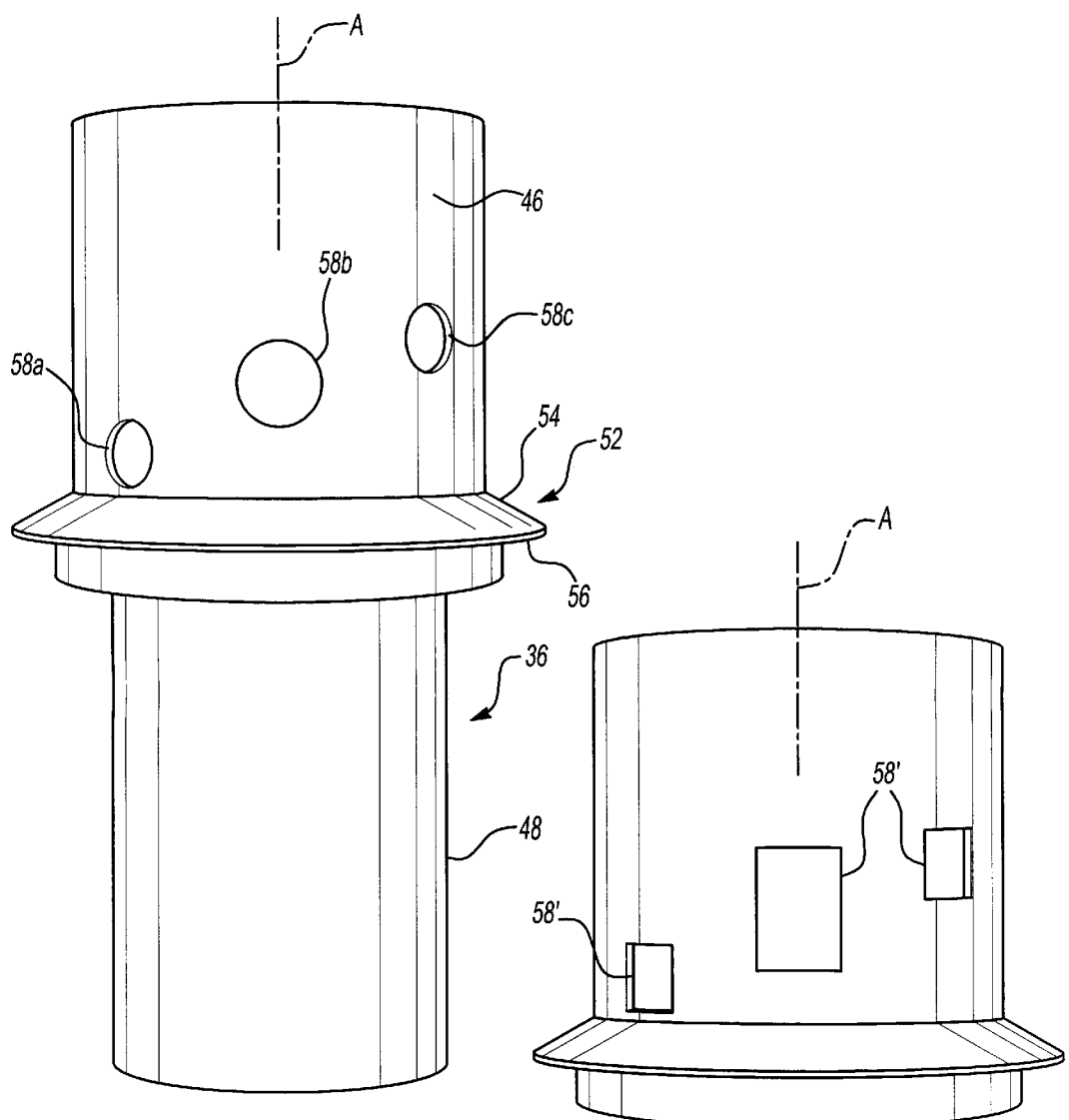

# BLEED VALVE SYSTEM FOR A GAS TURBINE ENGINE

BACKGROUND OF THE INVENTION

The present invention relates to a bleed valve for tapping or bleeding a portion of air from a gas turbine engine, and more particularly to a poppet for a bleed valve which provides regulated air flow to an aircraft environmental system.

It is common to bleed a portion of the inlet air from a gas turbine engine for a variety of purposes. Common purposes include providing a pressure differential on opposite sides of bearing seals to preclude oil leaks, to cool or heat components of the turbojet engine to control operational clearances, or to provide air conditioning or warm air to an aircraft cabin.

Typically, the air is tapped or bled at the gas turbine engine compressor and may be tapped between the low pressure compressor and the high pressure compressor, or from the cold air flow when the turbojet engine is of the turbo fan type. The selection of the source of the bleed air depends upon the desired temperatures and pressures of the air.

Known bleed valves may provide unstable partially open operation and are rather hard to control upon initial opening and just prior to closing. This instability results in high gain and relatively noisy operation. Such noise may be particularly disconcerting in aircraft environmental control systems which locates the bleed valve relatively close to the aircraft cockpit and passenger cabin. Further, the full open or full closed operation of known bleed valves is typically undesirable for aircraft environmental control systems in which intermediate operation is desirable for crew and passenger comfort.

Accordingly, it is desirable to provide a bleed valve assembly for a gas turbine engine which reduces leakage when closed while providing stable, controllable, and silent operation.

SUMMARY OF THE INVENTION

The bleed valve assembly according to the present invention provides a valve poppet that regulates bleed air from a gas turbine engine in a tailored manner. The valve poppet is a generally cylindrical member having a bleed portion and a base portion separated by a radially extending flange. The valve poppet is guided at both the bleed portion and the base portion to assures proper axial movement of the valve poppet and prevents rocking or yawing. The possibility of the valve poppet jamming is therefore greatly reduced.

The radially extending flange is located about the perimeter of the valve poppet to engage the valve seat on one side and receive a biasing member on the other. The flange engages the valve seat such that initial valve performance is similar to a disk valve, i.e., soft seating and very low leakage when closed.

A plurality of openings extend through the bleed portion such that partial open operation of the bleed valve assembly is particularly tailored for a desired flow. As the valve poppet moves off the valve seat, the initial gain is very low and then the gain increases steadily as more openings are exposed. The plurality of openings are preferably arrange as pairs of openings angularly separated by 180 degrees to balance side loads when the valve poppet is partially or fully open. Balanced aerodynamic side loads result in smoother and more stable operation.

The present invention therefore provides a bleed valve assembly for a gas turbine engine which reduces leakage when closed while providing stable, controllable, and silent operation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is an expanded view of a valve poppet illustrated in FIGS. 2A and 2B;

FIG. 5 is an expanded view of another valve poppet;

DETAILED DESCRIPTION OF THE PREFERRED EMBODIMENT

Figure 1:
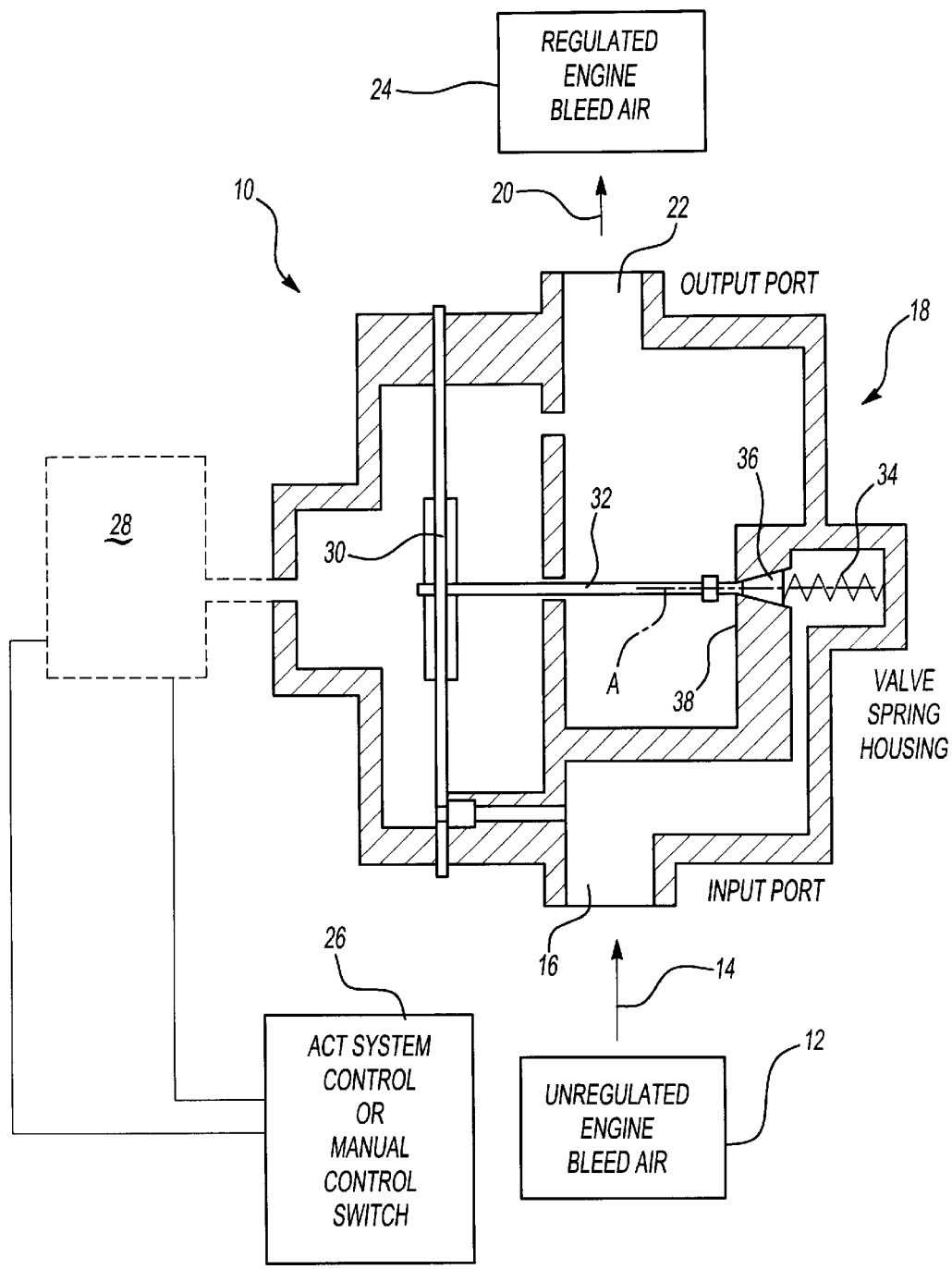
FIG. 1 is a general schematic view of an aircraft environmental control system having a bleed valve system according to the present invention.

FIG. 1 illustrates a general schematic view of an aircraft environmental control system 10. A gas turbine engine (illustrated schematically at 12) provides unregulated bleed air 14 to an input 16 of a bleed valve assembly 18. The bleed valve assembly 18 regulates the unregulated bleed air 14 and exhausts regulated bleed air 20 through an output 22 to, for example, an aircraft cabin (illustrated schematically at 24). It should be understood that other aircraft systems and uses will benefit from the regulated bleed air provided by the bleed valve assembly according to the present invention.

An aircraft environmental system controller 26 operates the bleed valve assembly 18 by providing an actuation fluid thereto. Preferably, the controller 26 operates a pneumatic system (schematically illustrated at 28) to pneumatically operate a diaphragm 30 within the bleed valve assembly 18. The diaphragm 30 drives a stem 32 to selective overcome a biasing member 34 and unseat a valve poppet 36 from a valve seat 38. The valve seat 38 is located between the input 16 and output 22 such that the poppet 36 moves in a stable, controllable, and silent manner along an axis A to regulate the bleed air as will be more fully described below.

Figure 2A:
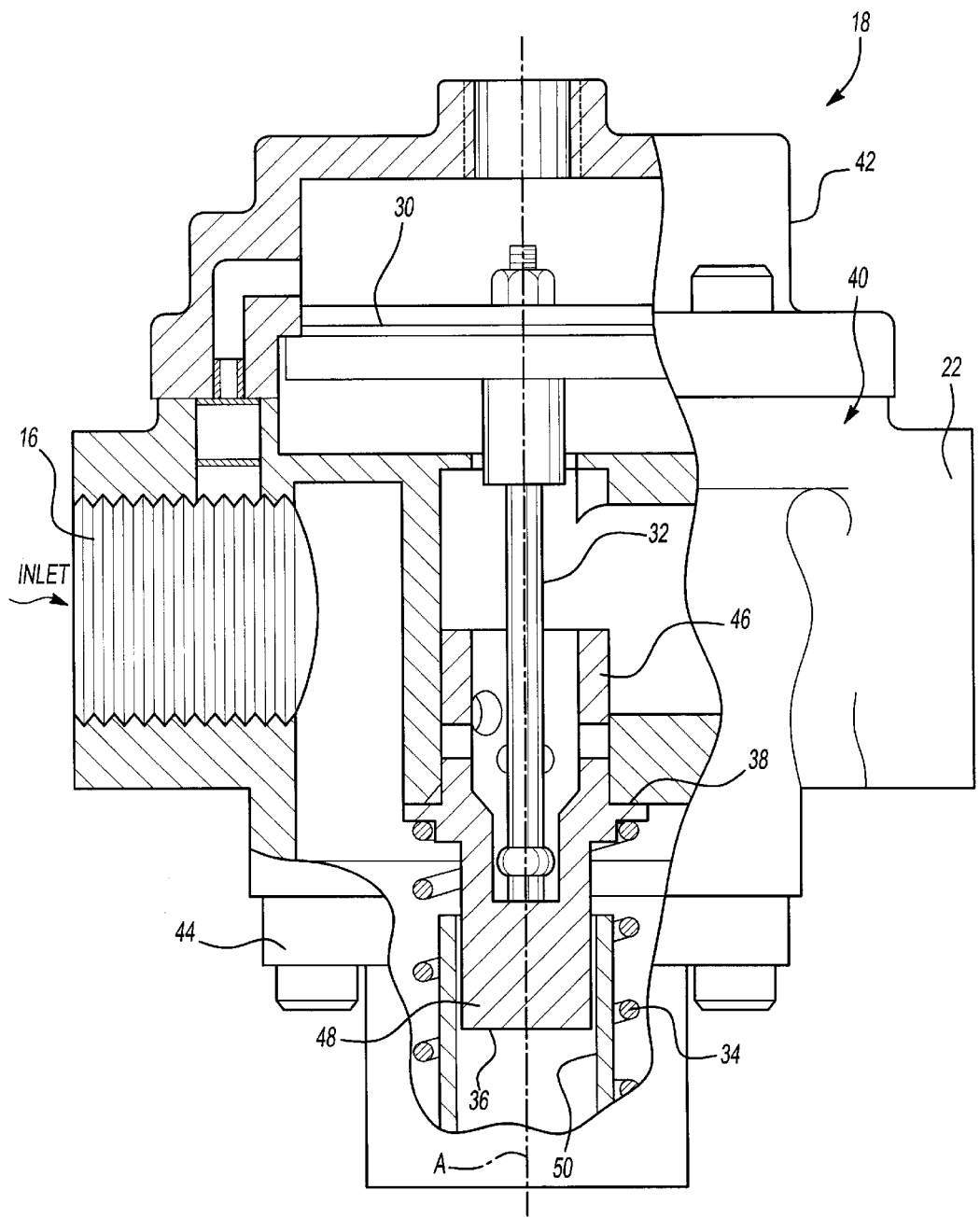
FIG. 2A is a partially sectional view of a bleed valve assembly according to the present invention in a closed position.

Referring to FIG. 2A, a partial sectional view of the bleed valve assembly 18 is illustrated. The bleed valve assembly 18 includes a housing 40 which includes the input 16, output 22 and the valve seat 38. The housing 40 maybe formed of a single unitary piece or multiple sections for ease of assembly and maintenance. Preferably a removable dome section 42 provides access to the diaphragm 30 while a housing portion 44 opposite thereof allows access to the valve poppet 36.

Figure 2B:
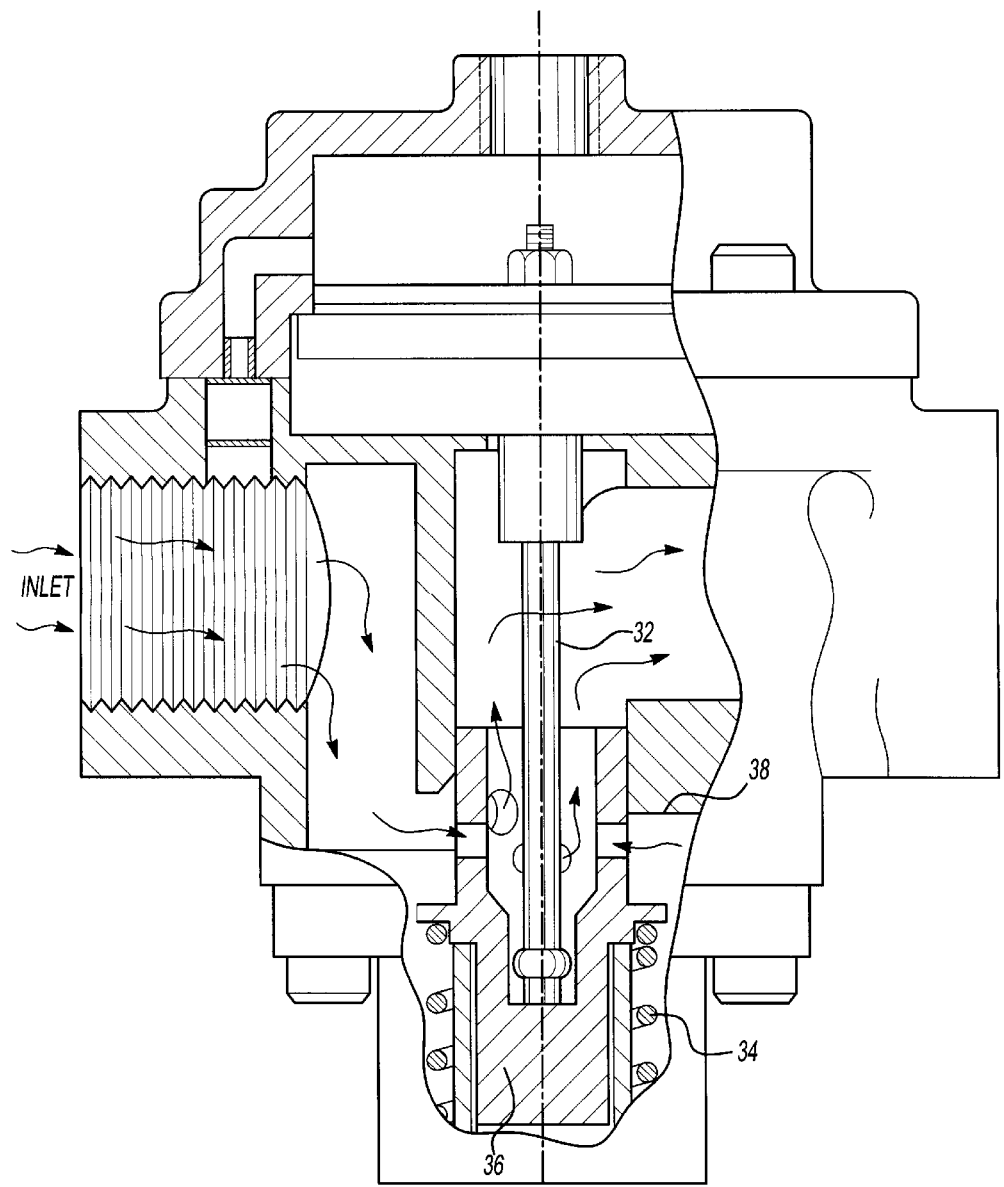
FIG. 2B is a partially sectional view of a bleed valve assembly according to the present invention in an open position.

The valve poppet 36 is a generally cylindrical member. A bleed portion 46 of the valve poppet 36 is preferably a hollow tubular portion. The bleed portion 46 receives the stem 32 therein. A base portion 48 of the valve poppet 36 is preferably a solid cylindrical portion which is received within a sleeve 50. The sleeve 50 closely fits the outer diameter of the base portion 48 such that the base portion 48 moves relative thereto. The valve poppet 36 is guided by interaction between the valve seat 38 and the bleed portion 46 and the base portion 48 and the sleeve 50. Such a guide arrangement assures proper axial movement of the valve poppet 36 along the axis A and prevents rocking or yawing. The possibility of the valve poppet 36 jamming is therefore greatly reduced. Further, even in a fully open position (FIG. 2B) the valve poppet 36 is guided at both the bleed and base portions 46, 48. Thus, the valve poppet 36 is guided throughout its range of motion to provide smooth operation. Moreover the valve poppet 36 is of less complex construction than known valve poppets.

Referring to FIG. 3, a radially extending flange 52 is located about the perimeter of the valve poppet 36 substantially perpendicular to axis A. The flange 52 engages the valve seat 38 on one side and receives the biasing member 34 on the other (FIG. 2A). The biasing member is preferably a coil spring which retains the sleeve 50 therein. Preferably, the flange 52 includes a frustro-conical surface 54 to engage the valve seat 32 and a stepped surface 56 to receive the biasing member 34 (FIGS. 2A, 2B) to center the biasing member relative to the sleeve 50. The flange 52 generally defines the demarcation between the bleed portion 46 and the base portion 48. The flange 52 engages the valve seat such that initial valve opening performance is similar to a disk valve, i.e., soft seating and very low leakage when closed.

A plurality of openings 58 extend through the bleed portion 46 substantially perpendicular to the axis A to regulate bleed air. Preferably, the plurality of openings 58 are arranged in sets 58a, 58b, 58c (also illustrated schematically in FIG. 4). Each set of openings 58a–c are preferably angularly and axially arranged about the bleed portion to provide the desired gain. That is, the partial open operation of the bleed valve assembly 16 is particularly tailored for desired flow as the flange 52 moves away from the valve seat 32 (closed position; FIG. 2A) an more openings 58 are sequentially exposed. Each set of openings 58a–58c are preferably arrange as pairs of openings angularly separated by 180 degrees to balance side loads when the valve poppet 36 is partially or fully open. Balanced aerodynamic side loads result in smoother and more stable operation.

Figure 4:
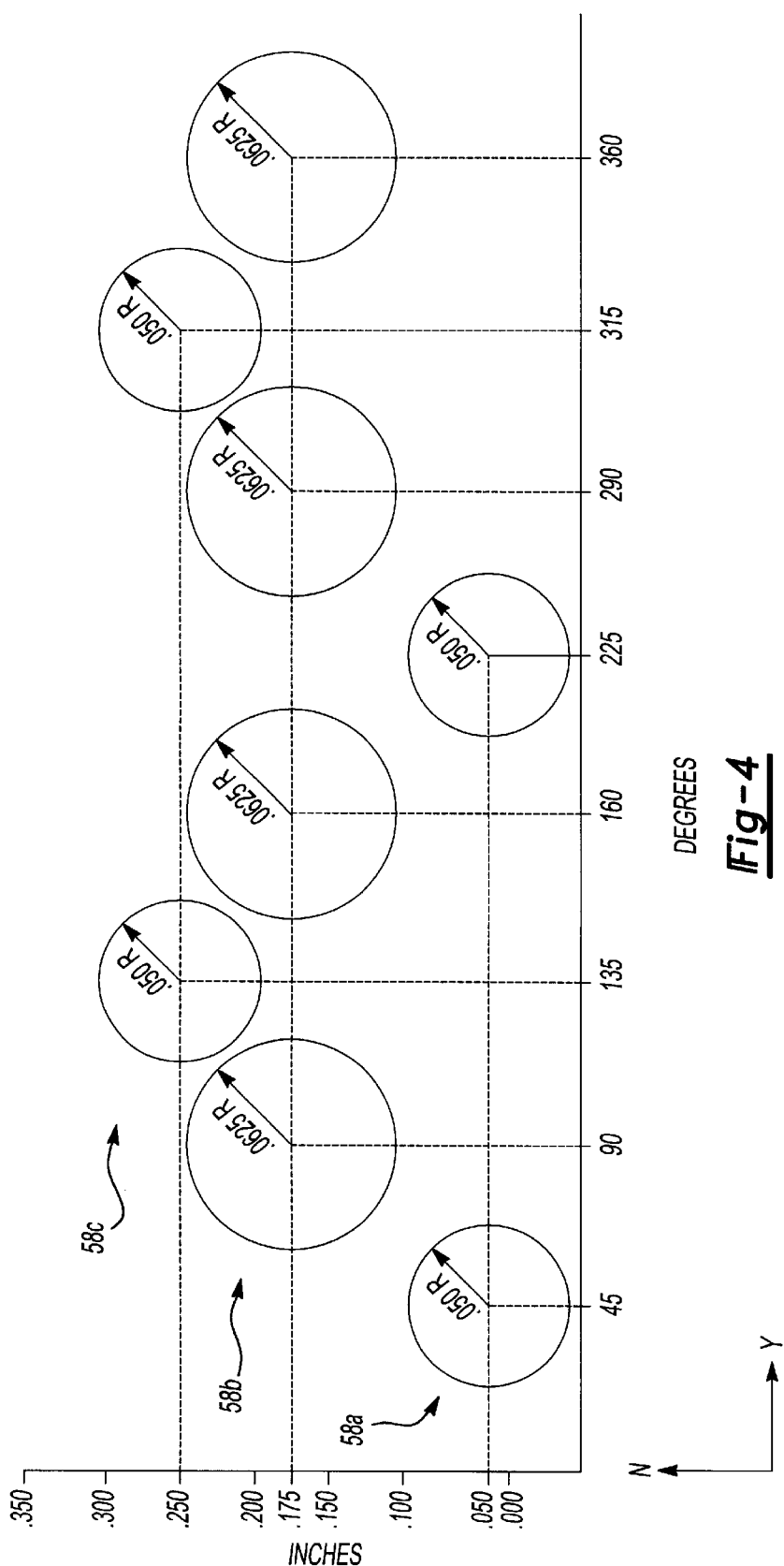
FIG. 4 is a schematic view of the relative location of a plurality of openings through the valve poppet of FIG. 3.

Referring to FIG. 4, the first set of openings 58a provides two openings located at a first axial distance and an angular distance of 45 and 225 degrees. The second set of openings 58b provides 4 openings located at a second axial distance and an angular distance of 90, 180, 270 and 360. Notably, the 90 degree opening is 180 degrees away from the 270 degree opening while the 180 degree opening is 180 degrees away from the 360 degree opening. The third set of openings 58c provides two openings located at a first axial distance an angular distance of 135 and 315 degrees. Notably, the relative diameter of the third set 58c and second set 58b axially overlap while the first set 58a and second set 58b do not. Particular axial arrangement provide the advantage of further tailoring the desired gain. It should be understood that other sets, shapes, axial overlap, numbers, sizes and other opening arrangements will benefit from the present invention to provide the desired gain and regulated flow. FIG. 4 illustrates circular openings. FIG. 5 illustrates substantially polygonal openings 58'.

Figure 6:
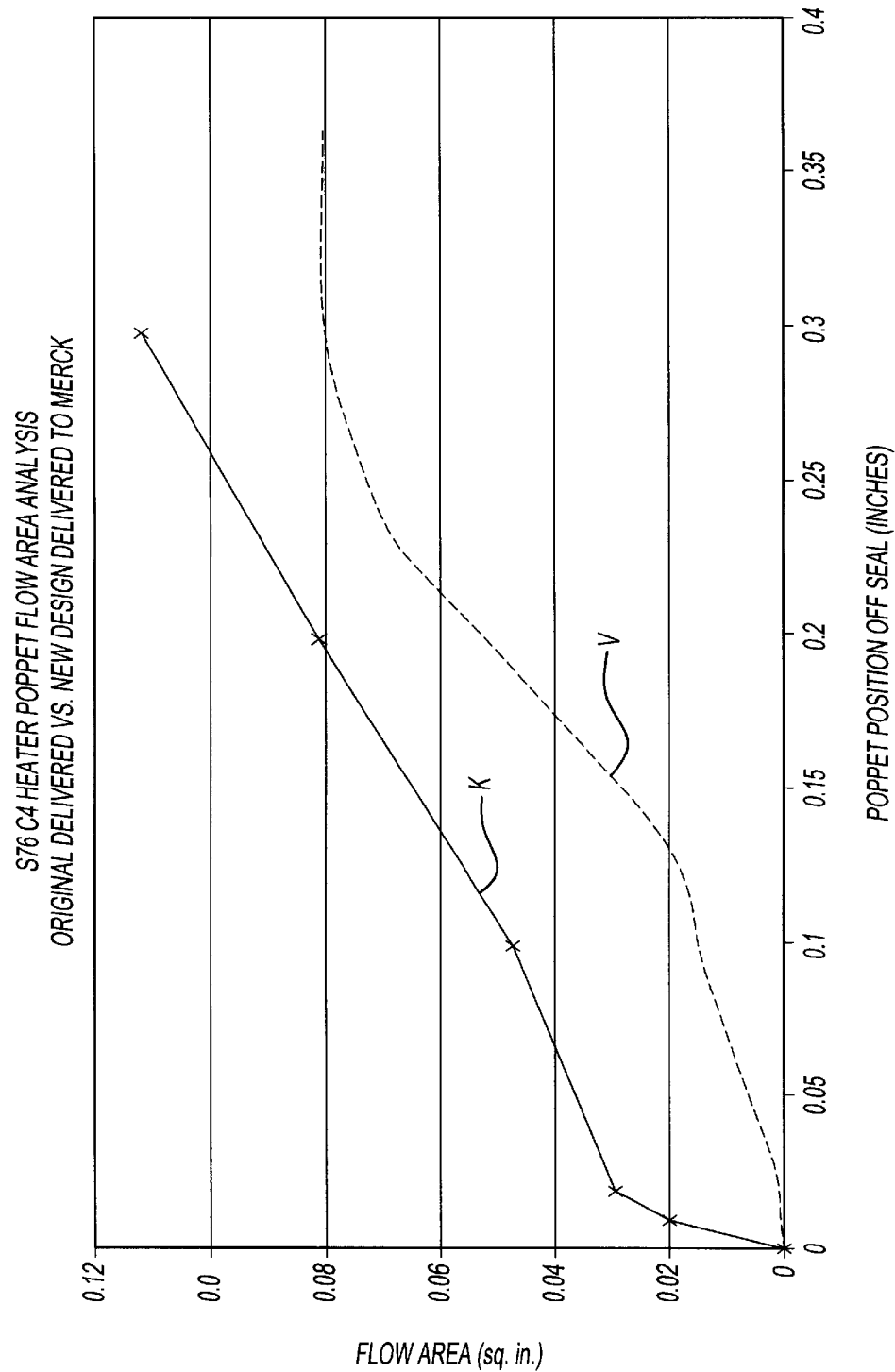
FIG. 6 is a graphical representation of the flow analysis of the valve poppet according to the present invention.

Referring to FIG. 6, flow analysis of the valve poppet 36 according to the present invention (dashed line V) is graphed relative to a known high gain bleed valve (solid line K). Notable, is the distinct difference in flow area within 0.025 inches of valve poppet travel relative to the fully closed position. Applicant has determined that the known high gain bleed valve generates unstable operation and objectionable noise during this distance. The valve poppet 36 according to the present invention provides a relatively flat change of flow area during travel close to the valve seat assures near silent operation. As illustrated by FIG. 6, as the valve poppet 36 of the present invention moves off the valve seat 38 (FIGS. 2A, 2B), the initial gain is very low and then the gain increases steadily as more openings are exposed.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A bleed air valve assembly for an aircraft environmental system comprising:
   a valve body having an inlet to intake unregulated bleed air from a gas turbine engine, an outlet port to exhaust regulated bleed air and a valve seat therebetween; and
   a substantially cylindrical valve poppet having a flange radailly extending about said poppet, said poppet selectively movable along an axis to unseat said flange from said valve seat to sequentially expose a plurality of opening sets through said valve poppet to said unregulated bleed air such that said opening sets regulate said unregulated bleed air.

2. The bleed air valve assembly as recited in claim 1 further comprising a biasing member to bias said flange toward said valve seat and a pneumatically actuated diaphragm to overcome said biasing member and unseat said flange from said valve seat.

3. The bleed air valve assembly as recited in claim 1 wherein said poppet is restrained in a yaw axis on one side of said flange by said valve seat and an opposite side of said flange by a sleeve within a biasing member.

4. The bleed air valve assembly as recited in claim 1, wherein said plurality of openings are arranged about said poppet substantially perpendicular to said axis.

5. The bleed air valve assembly as recited in clain 1, wherein said plurality of openings include a first and a second opening.

6. The bleed air valve assembly as recited in claim 5, wherein said first circular opening is offset 180 degrees relative to said second circular opening.

7. The bleed air valve assembly as recited in claim 1, wherein said plurality of openings include a polygonal opening.

8. The bleed air valve assembly as recited in claim 1, wherein said polygonal opening is a slot.

9. The bleed air valve assembly as recited in claim 1, wherein said plurality of openings include a plurality of opening sets arranged about said poppet substantially perpendicular to said axis, each of said opening sets displaced along said axis.

10. The bleed air valve assembly as recited in claim 9, wherein each of said sets are angularly offset about said poppet.

* * * * *